United States Patent Office 2,841,953
Patented July 8, 1958

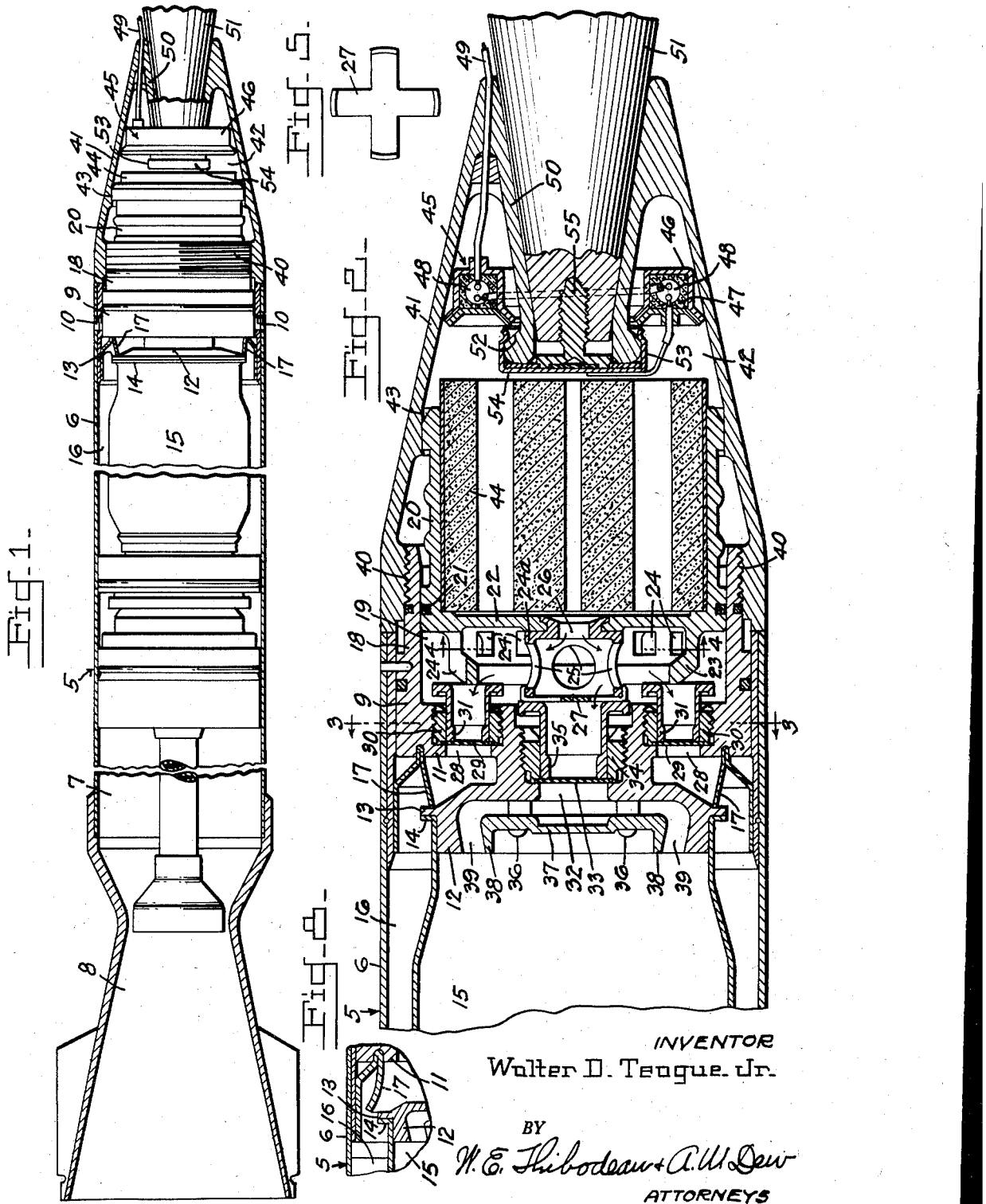

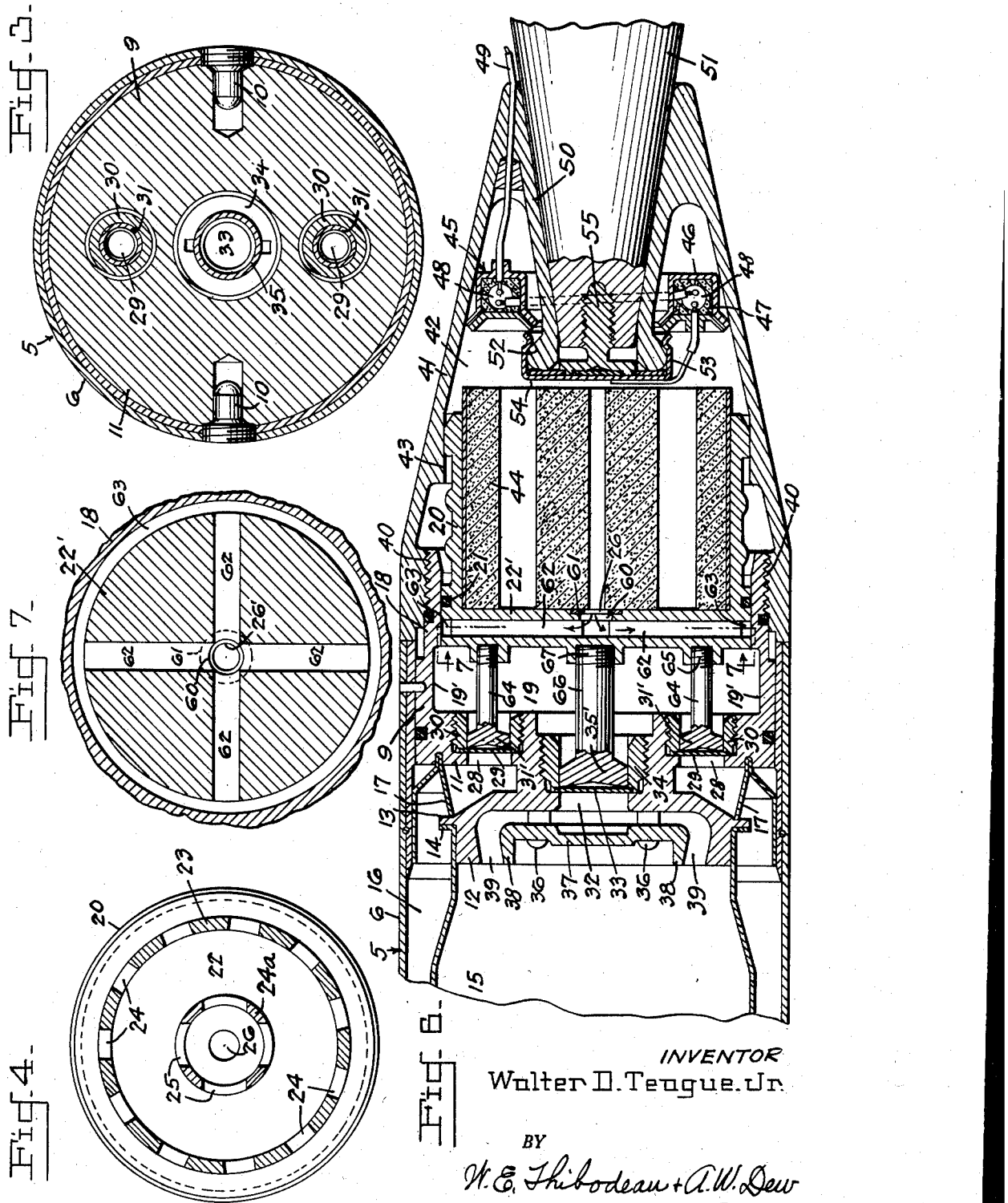

2,841,953

SYSTEM FOR PRESSURIZING THE FLUID PROPELLANT TANK OF A SELF-PROPELLED MISSILE

Walter D. Teague, Jr., Alpine, N. J., assignor to the United States of America as represented by the Secretary of the Army Application June 10, 1955, Serial No. 514,797

10 Claims. (Cl. 60—35.6)

This invention relates to a system for pressurizing the fluid propellant tank of a self-propelled missile.

The invention contemplates enclosing with the motor assembly all of the pressurizing mechanism, excepting the source of electrical energy necessary to initiate operation thereof. It is therefore an object of the invention to provide means for sealing the fluid tanks, at the ends opposite the mixing or combustion chamber of a rocket motor and means for simultaneously rupturing the seals under the influence of fluid pressure developed in a separate combustion chamber within the assembly by igniting an inflamable charge of preselected burning time which time is effectively correlated with the time of flight of the missile.

Another object of the invention is to provide a device having piston means movable by the pressure developed in the combustion chamber to urge the seal rupturing means through the seals and provide a passageway for the flow of expanding fluid pressure from the combustion chamber to the tanks.

Another object of the invention is to provide a metering orifice in the piston means whereby flow of fluid pressure on the downstream flow from the combustion chamber, is restricted to prevent a sudden pressure drop in the combustion chamber due to the sudden addition of unpressurized ullage of the liquid propellant tankage.

A further object of the invention is to provide diffusion means between the piston head and the seal rupturing means whereby fluid pressure from the metering orifice is distributed uniformly to each tank by way of the ruptured seals.

A still further object of the invention is to provide diffusion means carried in the piston head and held against release until after the tank seals are ruptured and a metering orifice for restricting flow of fluid pressure from the combustion chamber to the diffusion means.

Other objects and advantages will be apparent from the following detailed description and the accompanying drawings, in which:

Fig. 1 is a longitudinal sectional view of a rocket motor with parts in elevation, disclosing one form of the invention, Fig. 2 is a longitudinal sectional view to an enlarged scale of the forward end of the motor shown in Fig. 1, disclosing one form of the invention, Fig. 3 is a transverse sectional view taken on the line 3—3 of Fig. 2, looking in the direction of the arrows, Fig. 4 is a transverse sectional view taken on the line 4—4 of Fig. 2, looking in the direction of the arrows.

Fig. 5 is a detail view of a part of the deflector mechanism.

Fig. 6 is a longitudinal sectional view of a rocket motor with parts in elevation, disclosing a second form of the invention, and Fig. 7 is a transverse sectional view taken on the line 7—7 of Fig. 6, looking in the direction of the arrows.

Figure 8 is a view showing valve 17 of Figure 2 in its open position.

Referring now to Figs. 1 through 5 of the drawings, 5 identifies a rocket motor having an outer casing 6, a mixing chamber 7 and a thrust chamber 8. Inside the casing 6 and at forward end thereof a casting 9 of irregular formation is secured by any preferred means such as pins 10, Figs. 1 and 3. A transversely extending portion 11, Fig. 2, of the casting 9 provides a closure which prevents escape and mixing of the bi-propellent fluids. Extending rearwardly from the transverse closure 11 is an attaching ring 12 having a circumferentially extending flange 13 abutting a similar flange 14 on an acid tank 15 to effect a fluid tight connection therewith. A circumferentially extending space between the acid tank 15 and the outer casing 6 forms a fuel tank 16 closed at its forward end by a flap valve 17. A forwardly extending cylindrical or sleeve-like portion 18 of the casting 9 provides a diffusion chamber 19 which is interiorly machined to form a guiding surface for sliding piston 20. An O ring 21 of suitable packing material is seated in a groove in the piston to effect a gas tight seal. The piston 20 is formed with a head 22 carrying a diffusion ring 23 extending into the diffusion chamber 19 and concentric therewith. Radially extending vents 24 are provided in the periphery of the diffusion ring 23 for a purpose to be hereinafter brought out. Axially disposed on the piston head 22 is a deflector ring 24a having vents 25 in the periphery thereof and a metering orifice 26 axially thereof. The deflector ring 24a with its metering orifice is formed as an insert into the piston head 22 whereby deflectors having different size orifices may be employed as the demands of service require. A cut-out plate 27 of a cross-formation is placed across the rear open end of the ring 24a as an additional deflector, Figs. 2 and 5.

Ports 28 are formed in the transverse closure 11 in fluid communication with the forward end of the fuel tank 16 and each is sealed by a frangible diaphragm 29 held therein by screw threaded guides 30. Slidable in the guides 30 are hollow shearing punches 31 normally contacted by the rearward end of the diffusion ring 23 as clearly shown at Fig. 2.

An axially disposed port 32 is formed in the rearwardly extending attaching ring 12 and in fluid communication with the acid tank 15. The port 32 is normally closed by a frangible diaphragm 33 held therein by a screw-threaded guide 34. Slidable in the guide 34 is a hollow shearing punch 35 normally contacted by the rear end of the deflector ring 24a. Secured to the transverse closure 11 within the attaching ring 12 and spaced therefrom by screws or the like 36 is a deflector plate 37 having a circumferentially extending flange 38 spaced from the ring 12 to form an annular outlet 39.

Secured to the forward end of the cylindrical guide portion 18 of the casting 9, by means of screw threads 40, or other suitable means, is an ogival nose cap 41 forming a combustion chamber 42. A guiding surface 43 is formed within the nose cap to assist the piston 20 in straight line movement. An inflammable charge 44 is carried within the piston 20 and extends into the combustion chamber 42. An igniter 45 in the form of an annular container 46 filled with a black powder charge 47 and a series of squibs 48 serves to initiate combustion of the inflammable charge 44 when connected with proper circuitry 49 and a source of electric energy, not shown.

The forward end of the nose cap 41 is formed with an inturned reversed conical wall 50 to receive a similarly shaped rear end portion 51 of that portion of a rocket which carries the pay load. The rear end of the conical wall 50 is enlarged to form a circumferential shoulder 52 over which the flange 53 of a cap-shaped anchor plate 54 is crimped. A screw-threaded coupling 55 is secured to the anchor plate 53, by any preferred means and engages similar screw threads in the rear end of the conical portion 51 to secure the pay load and motor together.

The operation of the form of the invention shown in Figs. 1 through 5 is a follows:

When a rocket projectile, equipped with the present invention is to be launched, the wire 49 is connected to a source of electric energy and a switch, not shown, is closed igniting the squibs 48 and the black powder charge 47. Fire from the charge 47 initiates burning of the inflammable charge 44 building up gas pressure in the combustion chamber 42. Gas pressure builds up rapidly in the chamber 42 and forces piston 20 rearwardly causing the diffusion ring 23 and the deflector ring 24a to exert pressure on the punches 31 and 35 rupturing the diaphragms 29 and 33. The pressurized gas in the chamber 42 passes through the orifice 26, through the deflector ring 24a and its vents 25 into the diffusion ring 23 and to the diffusion chamber 19 through vents 24. The burning rate of the inflammable charge 44 is controlled by the surface area and composition of the charge. By proper selection of composition of the inflammable charge 44 and the size of the orifice 26 in the inserted deflector ring 24a, suitable build-up to equilibrium is achieved in both chambers 19 and 42. If no means were present to restrict flow of pressure between the combustion chamber and the propellant tanks, rupture of the diaphragms would result in a sudden pressure drop in the combustion chamber due to the sudden addition of unpressurized ullage of the liquid propellant tanks. The burning rate of the inflammable charge 44, and hence the rate of gas generation, would then decrease; and in extreme cases the charge 44 might cease to burn. Since the ullage of the liquid propellant tanks does vary as liquid propellants expand and contract with temperature changes, there would be considerable variation in initial pressure build-up in the propellant tanks if the metering orifice 26 were not of a preselected dimension along with the preselected burning rate of the inflammable charge 44.

Orifice 26 therefore aids the reliability of the powder pressurization by preventing wide variations in pressure build-up and also acts as a gas metering orifice during the expulsion of the liquid propellants into the thrust chamber 8 of the rocket unit.

The gas pressure builds up rapidly in chamber 42 and generates enough force to overcome any pressure due to ullage of the tanks 15 and 16 from temperature variations so that piston 20 will be driven rearwardly with sufficient force to puncture diaphragms 29 and 33.

When fluid pressure from the combustion chamber 42 flows through the metering orifice 26 it is deflected by the deflector ring 24a to the diffusion ring 23 where it is uniformly distributed within the diffusion chamber 19 and thereby uniformly distributed to the propellant tanks through the hollow punches 31 and 35 and the ports 28 and 32 respectively. The fluid pressure opens the flap valves 17 to reach the tank 16 and is further diffused to the central tank 15 by way of the port 32 and the annular opening 39.

Referring now to Figs. 6 and 7 of the drawings, 5 identifies a rocket motor having an outer casing 6. Inside the casing 6 and at the forward end thereof a casting 9 of irregular formation is secured by any preferred means. A transversely extending portion 11 of the casting 9 provides a closure which prevents escape and mixing of the bi-propellent fluids. Extending rearwardly from the transverse closure 11 is an attaching ring 12 having a circumferentially extending flange 13 abutting a similar flange 14 on an acid tank 15 in fluid tight connection. A circumferentially extending space between the acid tank 15 and the outer casing 6 forms a fuel tank 16 closed at its forward end by a flap valve 17. A forwardly extending cylindrical portion 18 of the casting 9 provides a diffusion chamber 19 which is interiorly machined to form a guiding surface for a sliding piston 20. The rearward portion of the diffusion chamber is diametrically enlarged, as at 19', for a purpose to be hereinafter explained. An O ring 21 of suitable packing material is seated in a groove in the piston to effect a gas tight seal. The piston 20 is formed with a head 22' having an axial bore 60. An insert plate 61 is let into the piston head 22' adjacent the bore 60 and has formed therein a metering orifice 26' coaxial with the bore 60. Radial ducts 62 serve as deflector means and a circumferential groove 63, formed in the exterior surface of the piston head 22', is in fluid communication with the radial ducts 62 and serve as the diffusion means.

Ports 28 are formed in the transverse closure 11 in fluid communication with the forward end of the fuel tank 16 and are sealed by the frangible diaphragms 29 held therein by screw threaded guides 30. Slidable in the guides 30 are shearing punches 31' having diametrically reduced stems 64 rigidly secured on the rear end of the piston head 22', as by the screw threaded connection 65, and normally in contact with the diaphragms 29. An axially disposed port 32 is formed in the rearwardly extending attaching ring 12 and in fluid communication with the acid tank 15. The port 32 is normally closed by a frangible diaphragm 33 held therein by a screw threaded guide 34. Slidable in the guide 34 is a shearing punch 35' having a diametrically reduced stem 66 rigidly secured on the rear end of the piston head 22', as by the screw threaded connection 67. Secured to the transverse closure 11 within the attaching ring 12 and spaced therefrom by screws or the like 36 is a deflector plate 37 having a circumferentially extending flange 38 spaced from the ring 12 to form an annular outlet 39.

Secured to the forward end of the cylindrical guide portion 18 of the casting 9, by means of screw threads 40, or other suitable means, is an ogival nose cap 41 forming a combustion chamber 42. A guiding surface 43 is formed within the nose cap to assist the piston 20 in straight line movement. An inflammable charge 44 is carried within the piston 20 and extends into the combustion chamber 42. An igniter 45 in the form of an annular container 46 filled with a black powder charge 47 and a series of squibs 48 serves to initiate combustion of the inflammable charge 44 when connected with proper circuitry 49 and a source of electric energy, not shown.

The forward end of the nose cap 41 is formed with an inturned reversed conical wall 50 to receive a similarly shaped rear end portion 51 of that portion of a rocket which carries the pay load. The rear end of the conical wall 50 is enlarged to form a circumferential shoulder 52 over which the flange 53 of a cap-shaped anchor plate 54 is crimped. A screw threaded coupling 55 is secured to the anchor plate 53 by any preferred means and engages similar screw threads in the rear end of the conical portion 51 to secure the pay load and motor together.

The operation of the form of the invention shown in Figs. 6 and 7 is as follows:

When a rocket projectile equipped with this form of the invention, is to be launched the wire 49 is connected to a source of electric energy and a switch, not shown, is closed igniting the squibs 48 and the black powder charge 47. Fire from the charge 47 initiates burning of the inflammable charge 44 buiding up gas pressure in the combustion chamber 42. Gas pressure builds up rapidly in the chamber 42 and forces the piston 20 and the punches 31' and 35' rearwardly rupturing the diaphragms 29 and 33. The pressurized gas in the chamber 42 passes through the orifice 26' to the radial ducts 62 and the circumferential groove 63 where it is held against release by the inner surface of the diffusion chamber 19. After the piston 22 has moved rearwardly far enough to rupture or shear the diaphragms 29 and 33 the circumferential groove 63 in the piston head is uncovered by the diametrically enlarged part 19' of the diffusion chamber 19. The deflected and diffused gas pressure then flows from the groove 63 around the stems 64 of the punches 31' and the stem 66 of the punch 35' through the respective ports 28 and 32 to the tanks 15 and 16. The pressurized hypergolic propellant components are then forced into the combustion chamber of the rocket motor where they ignite and produce gases whose rearward expulsion at high speed exerts the desired propelling thrust upon the missile.

While I have disclosed two forms of the invention presently prefered by me, various changes and modifications will occur to those skilled in the art after a study of the present disclosure. Hence the disclosure is to be taken in an illustrative rather than a limiting sense; and it is my desire and intention to reserve all modifications falling within the scope of the subjoined claims.

Having now fully disclosed the invention, what I claim and desire to secure by Letters Patent is:

1. In a system for pressurizing the fluid propellant tank of a self-propelled missile, means in said missile including a cylinder coaxial with said missile and forming a closed pressurizing chamber, a piston slidable axially in said cylinder and dividing said chamber into first and second axially aligned compartments, there being passageways in said piston opening through the wall thereof and communicating with said first compartment, said passageways being opened to said second compartment by rearward movement of said piston, a rupturable diaphragm normally sealing a passageway from said second compartment to said tank, means mounted adjacent said diaphragm and operated by and in response to rearward axial movement of said piston to rupture said diaphragm, and a combustible charge in said first compartment ignitable to generate pressure in said chambers to move said piston and thereby rupture said diaphragm and thereafter pressurize said tank.

2. In a system for pressurizing the fluid propellant tank of a self-propelled missile, means in said missile including a cylinder coaxial with said missile and forming a closed pressurizing chamber, a piston slidable axially in said cylinder and dividing said chamber into first and second axially aligned compartments, there being a metering orifice to restrict flow of pressurizing gas from said first compartment to said second compartment and tank, a rupturable diaphragm normally sealing a passageway from said second compartment to said tank, means mounted adjacent said diaphragm and operated by and in response to rearward axial movement of said piston to rupture said diaphragm and a combustible charge in said first compartment ignitable to generate pressure in said chambers to move said piston and thereby rupture said diaphragm and thereafter pressurize said tank.

3. A system for pressurizing the fluid propellant tanks of a self-propelled missile having a longitudinal axis of symmetry, first and second propellant tanks coaxial of said axis, said second tank surrounding said first tank, a closure plate closing the forward ends of both said tanks and forming a cylinder coaxial of said axis forwardly of said tanks, there being a single central aperture in said plate communicating with said first tank and a pair of diametrically disposed apertures in said plate communicating with said second tank, three rupturable diaphragms each secured over and sealing a respective one of said apertures, a piston slidably fitting said cylinder and defining first and second chambers forwardly and rearwardly of said piston, respectively, rupturing means operated by rearward movement of said piston to rupture said diaphragms, and a combustible charge carried by said piston in said forward compartment and, when ignited, pressurizing the same to force said piston rearwardly, simultaneously rupture said diaphragms and pressurize said second chamber and said tanks.

4. A system as recited in claim 3, there being a metering orifice in said piston between said chambers to control the rate of flow of gas therebetween to a predetermined maximum rate.

5. A system as recited in claim 3, there being a radial passageway in said piston in communication with said first chamber, said cylinder being constructed to open said passageway to said second chamber only after said piston has moved to rupture said diaphragms.

6. A system as recited in claim 3, each said aperture having a forwardly-facing shoulder, each said diaphragm resting upon a respective shoulder, a hollow plug threaded to each aperture and forcing each diaphragm onto a respective shoulder in pressure-tight relation therewith, said rupturing means comprising plungers each slidably fitting a respective plug.

7. In a device for uniformly pressurizing liquid propellant tanks in a rocket motor, a closure having a cylindrical extension forming a diffusion chamber, an inlet port in said closure for each tank, a frangible seal in each port, a punch for rupturing each seal, a piston slidable in the diffusion chamber for urging each punch simultaneously through a respective seal, an inflammable charge in said piston, an igniter for initiating burning of said charge, a combustion chamber accumulating fluid pressure from said inflammable charge for driving said piston and punches, diffusion means carried by said piston in the diffusion chamber said piston having a metering orifice therein for restricting flow of fluid pressure from said combustion chamber to said diffusion chamber and the ports in said closure after said frangible seals are fractured.

8. In a device for uniformly pressurizing liquid propellant tanks in a rocket motor, a closure member for said tanks and having an axial bore defining a diffusion chamber and a port in communication with each tank, a frangible seal in each port for confining the liquid propellants, in the respective tanks, a punch slidable in each port, a piston including a head slidable in a cylinder in diffusion chamber and having a central orifice in its head, a powder charge in said piston, an ogival nose on the forward end of the motor and forming a combustion chamber with said piston, and means for igniting said powder charge for pressurizing the combustion chamber, said piston moving rearwardly under the urge of expanding gas pressure in the combustion chamber forcing said punches rearwardly shearing said frangible seals simultaneously and opening said ports to the flow of gas pressure from the combustion chamber through the central orifice in said piston head and the diffusion chamber to said ports.

9. In a device for uniformly pressurizing liquid propellant tanks in a rocket motor, a pair of tanks, a closure member adjacent the forward open ends of the tanks said closure member having a port in fluid communication with each tank and a concentric bore forming an open end cylinder, a frangible seal in each port, a shearing punch slidable in each port, a casing forming a combustion chamber, a hollow piston slidable in said cylinder and having a head formed with a central orifice therein, a powder charge in said piston, and an igniter in the combustion chamber for initiating combustion of said powder charge, means on the cylinder head for diffusing the gases passing through the central orifice from said powder charge for effecting uniform pressure at the ports, said slidable piston simultaneously driving each shearing punch through respective diaphragms when gas pressure of said powder charge develops to a predetermined degree in the combustion chamber.

10. In a device for uniformly pressurizing liquid propellant tanks in a rocket motor, a pair of coaxially disposed tanks, a closure member secured to and closing the contiguous ends of said tanks, said closure member having a port in communication with each tank, said closure member also having a forwardly extending diffusion chamber, a frangible seal normally closing each said port, a piston slidable in a cylinder in the diffusion chamber and having a head formed therewith, diffusion means carried in the piston head including a central metering orifice, a powder charge in said piston on the side remote from said ports, a casing enclosing said piston and powder charge and forming a combustion chamber, an igniter in the combustion chamber for initiating combustion of said powder charge, and shear means in each port operated responsive to rearward movement of said piston when sufficient gas pressure is developed in the combustion chamber to urge said piston and shear means rearwardly simultaneously fracturing each said frangible seal and effecting a predetermined rate of gas pressure flow to the tanks from the combustion chamber through the central metering orifice and the diffusion means.

References Cited in the file of this patent

UNITED STATES PATENTS

| | | |
|---|---|---|
| 1,933,694 | Allen et al. | Nov. 7, 1933 |
| 2,671,312 | Roy | Mar. 9, 1954 |
| 2,789,505 | Cumming et al. | Apr. 23, 1957 |